(12) United States Patent
Su et al.

(10) Patent No.: US 8,107,374 B2
(45) Date of Patent: Jan. 31, 2012

(54) LINK ADAPTION IN WIRELESS COMMUNICATIONS

(75) Inventors: Yu T. Su, Hsinchu (TW); Yen-Shuo Lu, Hsinchu (TW); Chih-Lun Weng, Hsinchu (TW); Jiun-Yo Lai, Taichung (TW); Jen-Yuan Hsu, Jincheng Township (TW); Pang-An Ting, Fongyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 627 days.

(21) Appl. No.: 12/343,778

(22) Filed: Dec. 24, 2008

(65) Prior Publication Data

US 2010/0008308 A1    Jan. 14, 2010

Related U.S. Application Data

(60) Provisional application No. 61/079,107, filed on Jul. 8, 2008.

(51) Int. Cl.
*G01R 31/08* (2006.01)
(52) U.S. Cl. ......... 370/231; 370/232; 370/319; 370/344
(58) Field of Classification Search ............... 370/203, 370/230, 231, 232, 233, 319, 344, 395.21, 370/430; 375/260; 714/748
See application file for complete search history.

(56) References Cited

U.S. PATENT DOCUMENTS

| 7,545,772 | B2 * | 6/2009 | Hwang et al. | 370/329 |
|---|---|---|---|---|
| 2007/0121746 | A1 * | 5/2007 | Cho et al. | 375/260 |
| 2007/0153928 | A1 * | 7/2007 | Liu et al. | 375/260 |

OTHER PUBLICATIONS

3GPP TS 36.300 V8.5.0 (May 2008), 3rd Generation Parnership Project: Technical Specificaiton Group Radio Access Network; Evolved Universal Terrestrial Radio Access (E-UTRA) and Evolved Universal Terrestrial Radio Access Network (E-UTRAN); Overall description; Stage 2 (Release 8).*

* cited by examiner

*Primary Examiner* — Marsha D Banks Harold
*Assistant Examiner* — Alvin A Zhu
(74) *Attorney, Agent, or Firm* — Finnegan, Henderson, Farabow, Garrett & Dunner, LLP

(57) ABSTRACT

Methods and systems for providing generalized link adaptation in an orthogonal frequency-division multiple access wireless communications network can include determining a number of desired resource blocks (RBs) for each user of a plurality of users; calculating a maximal channel gain $G_m$ for each RB of a plurality of RBs; reordering the plurality of RBs based on the $G_m$; assigning one of the plurality of RBs to the plurality of users one-by-one according to the reordering of the plurality of RBs; determining a priority list for assigning remaining unassigned RBs; assigning the remaining unassigned RBs to the plurality of users based on the priority list; and mapping a symbol or a packet to each assigned RB.

16 Claims, 8 Drawing Sheets

200

LINK ADAPTION IN WIRELESS COMMUNICATIONS

RELATED APPLICATIONS

This application claims the benefit of U.S. Provisional Application No. 61/079,107, filed Jul. 8, 2008, the contents of which is incorporated in its entirety herein by reference.

TECHNICAL FIELD

This invention relates to radio link adaption and, more specifically, to generalized link adaptation (GLA) techniques in a wireless communications network.

DISCUSSION OF RELATED ART

Link adaption (LA) relates to how various wireless communications parameters and resources may affect a radio link. The application of LA techniques, such as adjusting or adapting certain radio transmission resources, may allow a radio link to operate more efficiently. Conventional LA techniques focus on transmission resources, such as modulation and coding options. With regard to adaptive coding options, one example of an LA technique is automatic retransmission request (ARQ). Other exemplary LA techniques include automatic modulation and coding (AMC) and hybrid automatic retransmission request (HARQ), which can be found in the IEEE 802.16e standard.

Generalizing the notion of LA techniques by considering other transmission resources, such as transmit power, signal dimensions-frequency, time, and space, may improve link quality and enhance radio coverage. Such generalized link adaptation (GLA) techniques are particularly attractive and meaningful with respect to the use of orthogonal frequency-division multiple access (OFDMA) in conjunction with the IEEE 802.16m standard since OFDMA appears to provides flexible physical link layer (PHY) adaptations. OFDMA accommodates multiuser access on the same channel and allows implementations of dynamic resource allocation and opportunistic scheduling.

Data throughput performance of packet transmissions in a wireless network may depend on the radio resources. Allocation of these radio resources among multiple users sharing channels may be critical. OFDMA implementations may result in high resource utilization efficiency while meeting various multiuser multimedia communication requirements.

There is, therefore, a need to provide a link adaptation technique using dynamic resource management in a multiuser multimedia OFDMA based wireless communications environment.

SUMMARY

Consistent with embodiments of the present invention, there is provided a method for generalized link adaptation in an OFDMA wireless communications network, the method comprising: determining a number of desired resource blocks (RBs) for each user of a plurality of users; calculating a maximal channel gain $G_m$ for each RB of a plurality of RBs; reordering the plurality of RBs based on the $G_m$; assigning one of the plurality of RBs to the plurality of users according to the reordering of the plurality of RBs; determining a priority list for assigning remaining unassigned RBs; assigning the remaining unassigned RBs to the plurality of users one-by-one based on the priority list; and mapping a symbol or a packet to each assigned RB.

Also consistent with embodiments of the invention, there is provided a system for generalized link adaptation in an OFDMA wireless communications network, the system comprising: a transmitter unit configured to determine a number of desired RBs for each user of a plurality of users, calculate a maximal channel gain $G_m$ for each RB of a plurality of RBs, reorder the plurality of RBs based on the $G_m$, assign one of the plurality of RBs to the plurality of users according to the reordering of the plurality of RBs, determine a priority list for assigning remaining unassigned RBs, assign the remaining unassigned RBs to the plurality of users one-by-one based on the priority list, map a symbol or a packet to each assigned RB, and transmit the assigned RBs to a mobile station.

These and other embodiments of the present invention are further described below with reference to the following figures.

DETAILED DESCRIPTION

Figure 1A:
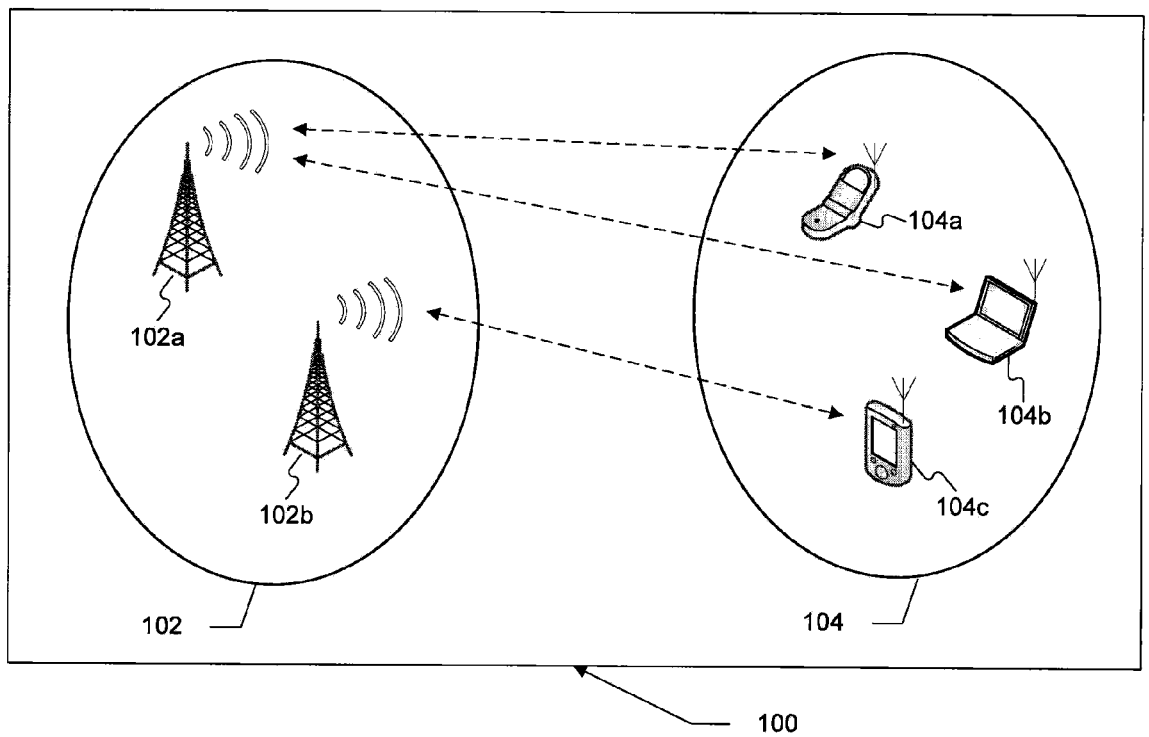
FIG. 1a is a block diagram illustrating an exemplary wireless communications network.

This description is explicative of certain embodiments of the invention and should not considered to be limiting. The system components and methods are represented herein by appropriate conventional symbols in the drawings, showing only those specific details that are pertinent to understanding the embodiments of the present invention, so as not to obscure the disclosure with details that will be readily apparent to those of ordinary skill in the art having the benefit of the description herein.

Embodiments consistent with the present invention may be implemented using a GLA multiuser HARQ protocol, which may combine dynamic resource management and HARQ in an OFDMA network.

FIG. 1a illustrates an exemplary wireless communications network 100 in which various embodiments of the invention may be practiced. It should be understood that various functional units depicted can, in practice, individually or in any combinations, be implemented in hardware, in software executed on one or more hardware components (such as on one or more processors, in one or more application specific integrated circuits, or in other such components), or in any combination thereof.

Wireless communications network 100 includes one or more base stations (BSs) 102, e.g., BS 102a and BS 102b. BSs 102 may be fixed or mobile transceivers that communicate/exchange data over the airways using radio communications with one or more mobile stations (MSs) 104, e.g., MS 104a, MS 104b, and MS 104c. MSs 104 may be may any type of computing device capable of radio communications, such as cellular phones, personal computers, television receivers, MP3 players, personal digital assistants (PDAs) or any other video, audio, or data devices.

Figure 1B:
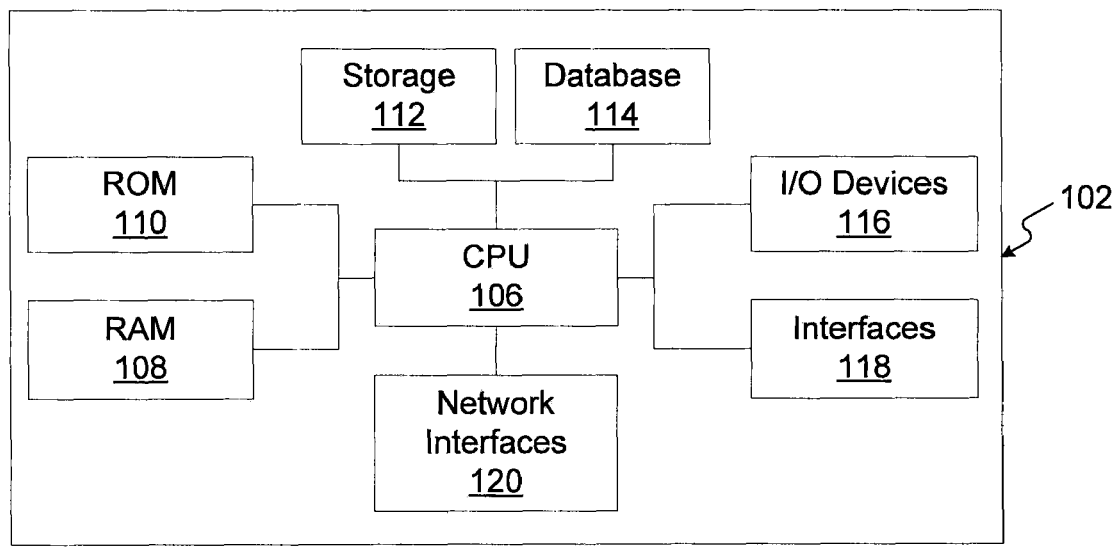
FIG. 1b is a block diagram of an exemplary base station (BS)

FIG. 1b is a block diagram of an exemplary BS 102. As shown in FIG. 1b, BS 102 may include one or more of the following components: at least one central processing unit (CPU) 106 configured to execute computer program instructions to perform various processes and methods, random access memory (RAM) 108 and read only memory (ROM) 110 configured to access and store information and computer program instructions, memory 112 to store data and information, databases 114 to store tables, lists, or other data structures, I/O devices 116, interfaces 118, network interfaces 120, etc.

Figure 1C:
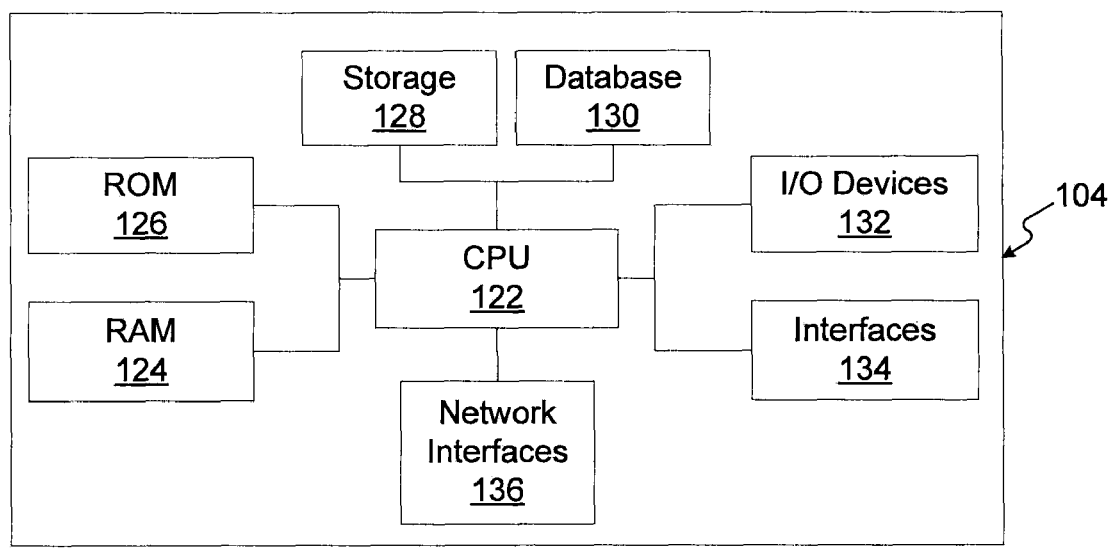
FIG. 1c is a block diagram of an exemplary mobile station (MS)

FIG. 1c is a block diagram of an exemplary MS 104. As shown in FIG. 1c, MS 104 may include one or more of the following components: at least one central processing unit (CPU) 122 configured to execute computer program instructions to perform various processes and methods, random access memory (RAM) 124 and read only memory (ROM) 126 configured to access and store information and computer program instructions, memory 128 to store data and information, databases 130 to store tables, lists, or other data structures, I/O devices 132, interfaces 134, network interfaces 136, etc.

Figure 2:
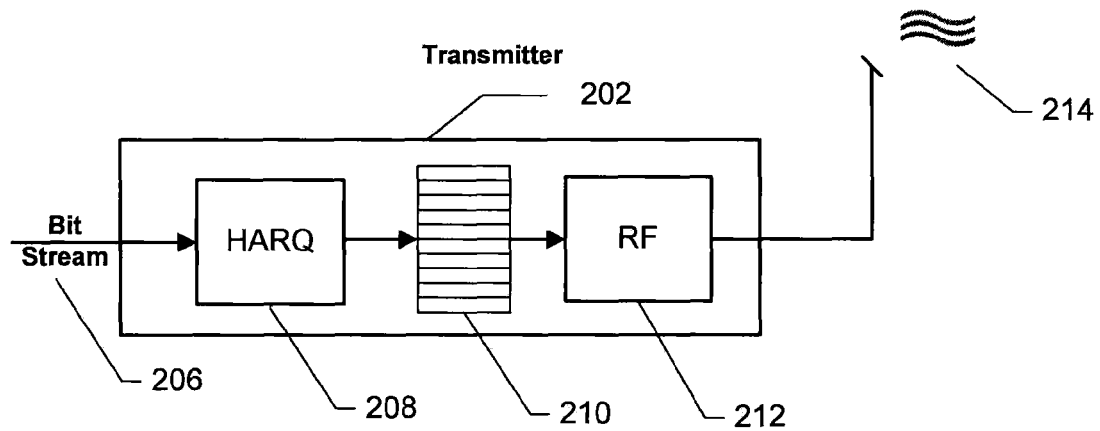
FIG. 2 is a block diagram depicting components of an OFDMA system enabled network interface consistent with an embodiment of the present invention.
Figure 2:
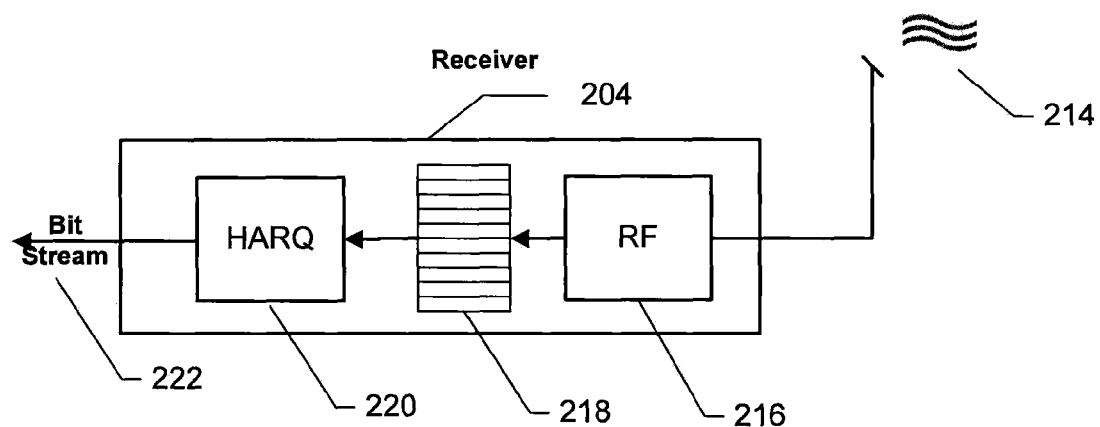

FIG. 2 is a block diagram depicting components of an OFDMA system 200. OFDMA system 200 includes a transmitter 202 and a receiver 204. Each one of network interfaces 120 and/or each one of network interfaces 136 may include OFDMA system 200. Thus, transmitter 202 may be part of one of BSs 102 and receiver 204 may be part of one of MSs 104. Conversely, transmitter 202 may be part of one of MSs 104 and receiver 204 may be part of one of BSs 102. Transmitter 202 may accept a data bit stream 206. A GLA multiuser HARQ protocol block 208 may dynamically allocate N-orthogonal subcarriers 210 and map the bits of bit stream 206 into encoded data packets or symbols for the N-orthogonal subcarriers 210 of OFDMA system 200. A radio frequency block 212 may then generate (transmit) an OFDMA signal 214 by modulating the subcarriers 210. Receiver 204 may receive OFDMA signal 214. A radio frequency block 216 may demodulate OFDMA signal 214 into encoded data packets 218 for use by a HARQ protocol block 220. Receiver 204 may output a data bit stream 222 based on data received from HARQ protocol block 220.

A HARQ protocol may be designed to improve or transmission delay/throughput performance. Incorporating proper transmission resource allocation and scheduling in a HARQ design may improve transmission performance in some applications. Transmission resources may include, for example, modulation and coding schemes, transmit power, subcarriers, time-slots, spatial (eigen) channels, and cooperative relays and transmit schedules. Documentation for IEEE 802.16m defines a resource block (RB) as a collection of several consecutive subcarriers and symbols. Embodiments consistent with the present invention may be applied to other RBs, such as where the property of an RB, e.g., subcarrier gain during several orthogonal frequency-division multiplex (OFDM) symbols, remains unchanged. For simplicity of illustration, the description herein assumes a one-dimensional RB, i.e., a subcarrier as the RB, but also includes numerical performance examples corresponding to use of an IEEE 802.16m RB.

Other embodiments may consider additional transmission resources, such as power and bit allocation, transmit scheduling, and other resources.

In some embodiments, a GLA technique may be based on one or more of the following GLA guidelines/rules.

Higher subcarrier allocation priority may be given to those users with more transmission attempt failures, although such higher priority can be superseded by quality of service (QoS) constraints, such as delay.

In a multicarrier transmission system, channel gains for subcarriers may differ, although gains for adjacent subcarriers tend to be correlated. Moreover, the channel gain of a given subcarrier may also vary with the transmit location of the user. A subcarrier can be "good" for one user while "bad" for another user, the terms "good" and "bad" being used herein in a relative sense only. In order to prevent a low-priority user from obtaining only bad subcarriers, a certain degree of fairness in subcarrier allocation may be maintained among all users.

Mapping of data bits within a packet for assigned subcarriers may be alternated in each transmission. In some embodiments, diversity gain and/or fairness may be obtained from such bit-mapping.

Figure 3:
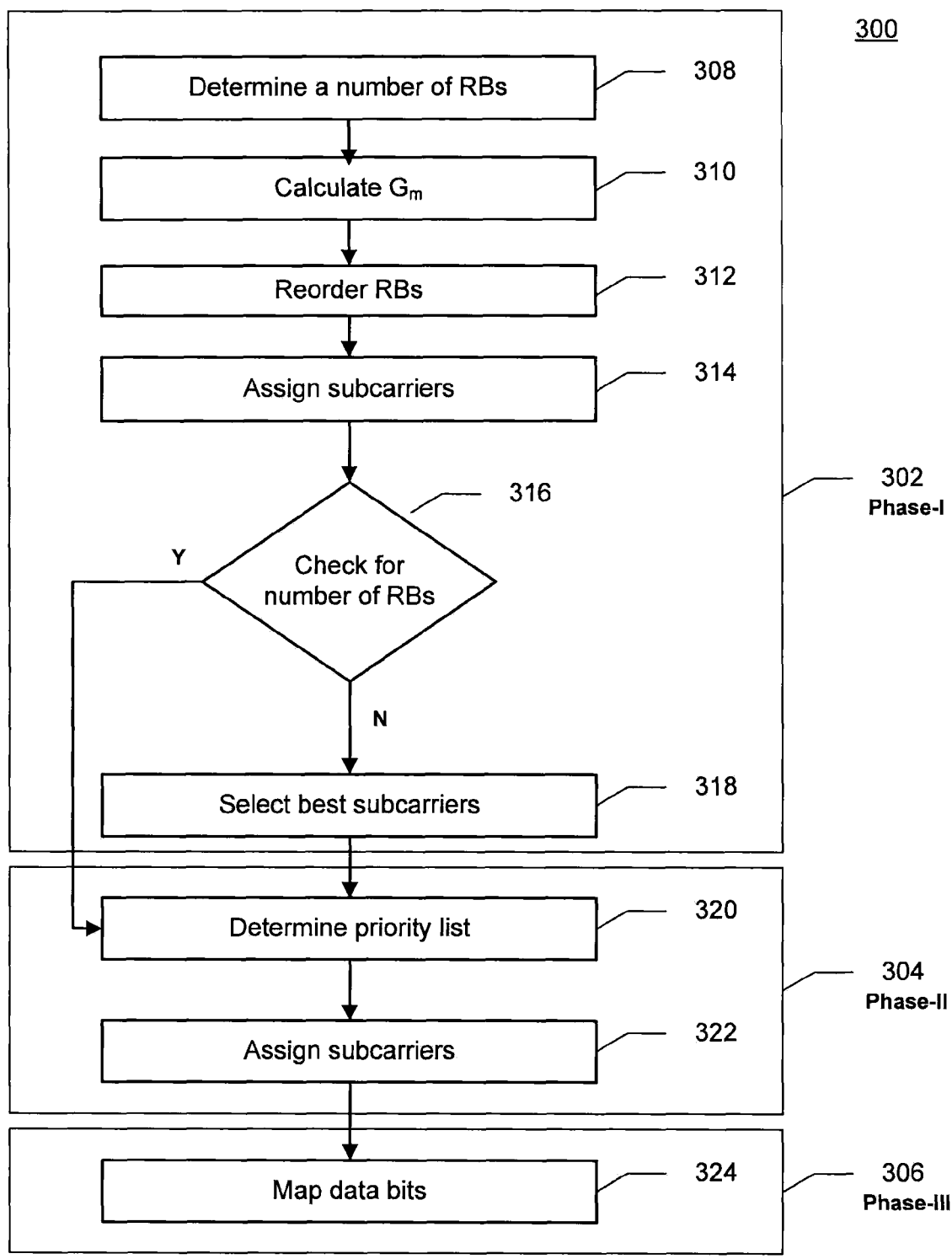
FIG. 3 is a flow chart depicting a method for implementing a GLA technique for improved throughput performance using dynamic resource management and HARQ consistent with an embodiment of the present invention.

FIG. 3 is a flowchart 300 depicting an embodiment of a method for implementing a GLA technique for improved throughput performance using dynamic resource allocation and multiuser HARQ. Referring to FIG. 3, flowchart 300 is divided into three phases: a Phase-I 302, a Phase-II 304, and a Phase-III 306. A GLA resource efficient multiuser HARQ protocol may be derived using the three phases (302, 304, and 306) in flowchart 300. An M-subcarrier K-user OFDMA system is assumed.

Phase-I 302 may use a ranked sequence of differential channel gains to establish resource allocation for satisfying a basic QoS requirement. Phase-I 302 may also consider fairness among users. A maximal channel gain can be expressed as:

$$G_m = \max_k g_{mk}, m = 1, \ldots M, k = 1, \ldots K, \quad (1)$$

where $g_{mk}$ is a channel gain of an mth subcarrier of a kth user.

A number of desired subcarriers (RBs) $N_k$ to be used for a user k is determined (308). A maximal channel gain $G_m$ of an mth subcarrier among K users may be calculated using equation (1) (310). All subcarriers may then be re-indexed, e.g., $G_1 \rightarrow G'_1, G_4 \rightarrow G'_2, G_5 \rightarrow G'_3, \ldots$, in descending order based on the $G_m$, i.e. $G'_m \geq G'_1 \geq G'_2 \ldots \geq G'_M$ (312). Subcarriers may be assigned one-by-one according to the above reordering (314), wherein subcarrier m may be assigned to user k if $$\frac{g_{mk}}{g_{mj}} > \lambda > 1$$

for all j≠k, where λ is a constant. Further, a subcarrier may only be assigned to user k if user k has not already been assigned a maximum predetermined percentage β % of $N_k$. A check (316) may be made for fairness to determine if each user has at least a minimum predetermined percentage α % of that user's desired RBs $N_k$ as determined in 308. If the check is true (316—Yes), then no additional subcarriers (RBs) are assigned to that user in Phase-I 302. Otherwise (316—No), the best subcarriers (e.g., largest channel gains) may be selected for the particular user from a list of unassigned subcarriers until the minimum predetermined percentage α % is reached (318).

In Phase-II 304, remaining unassigned subcarriers may be assigned to users A priority list for assigning remaining subcarriers to the users is determined (320). In one embodiment, if more than one user was not given enough subcarriers in Phase-I 302, any remaining subcarriers may be assigned to those users according to a priority policy, such as may be found in the above GLA guidelines/rules, until all users' bandwidth requirements are satisfied. In one embodiment, the user priority in obtaining unassigned subcarriers may be determined by the number of past transmission attempts for a given packet, such as may be required by that user's QoS requirements (especially delay), and user channel conditions. Using the determined priority list (320), users may be assigned their best available subcarriers (RBs) one-by-one until $N_k$ is satisfied for each user k (322).

In Phase-III 306, a mapping of data bits (symbols) for all assigned subcarriers (RBs) from Phase-I 302 and Phase-II 304 is performed (324). The assigned subcarriers may be classified into L groups of subcarriers according to their respective channel gains, wherein each group is a sub-channel. For a given sub-channel, a group-based permutation on the bits-to-subcarriers, i.e., permuting bits across a group of subcarriers, may be performed for each retransmission, i.e., when the number of transmission attempts is $\geq 1$, based on the above GLA guidelines/rules, such that average channel gains for every coded bit may be as close as possible. In other words, if retransmission is necessary, then the permuted coded bits-to-subcarriers mapping is such that each bit or group of bits is carried by the same number of "good" RBs and "bad" RBs.

In one embodiment, when the GLA method shown in flowchart 300 is applied to an RB defined as a group of D consecutive subcarriers in S OFDM symbols, then a channel gain may be defined as a mean channel gain averaged over the D subcarriers such that $DW<B_c$ and $ST<t_c$, where W is a subcarrier spacing, T is a symbol duration, $B_c$ is a coherent bandwidth of an OFDM channel, and $t_c$ is a coherent time of an OFDM channel.

In one embodiment, the required RB number may be different for each transmission if an incremental redundancy based HARQ is used.

In one embodiment, the above described method of flowchart 300 may be used in conjunction with any type of ARQ protocol.

Figure 4:
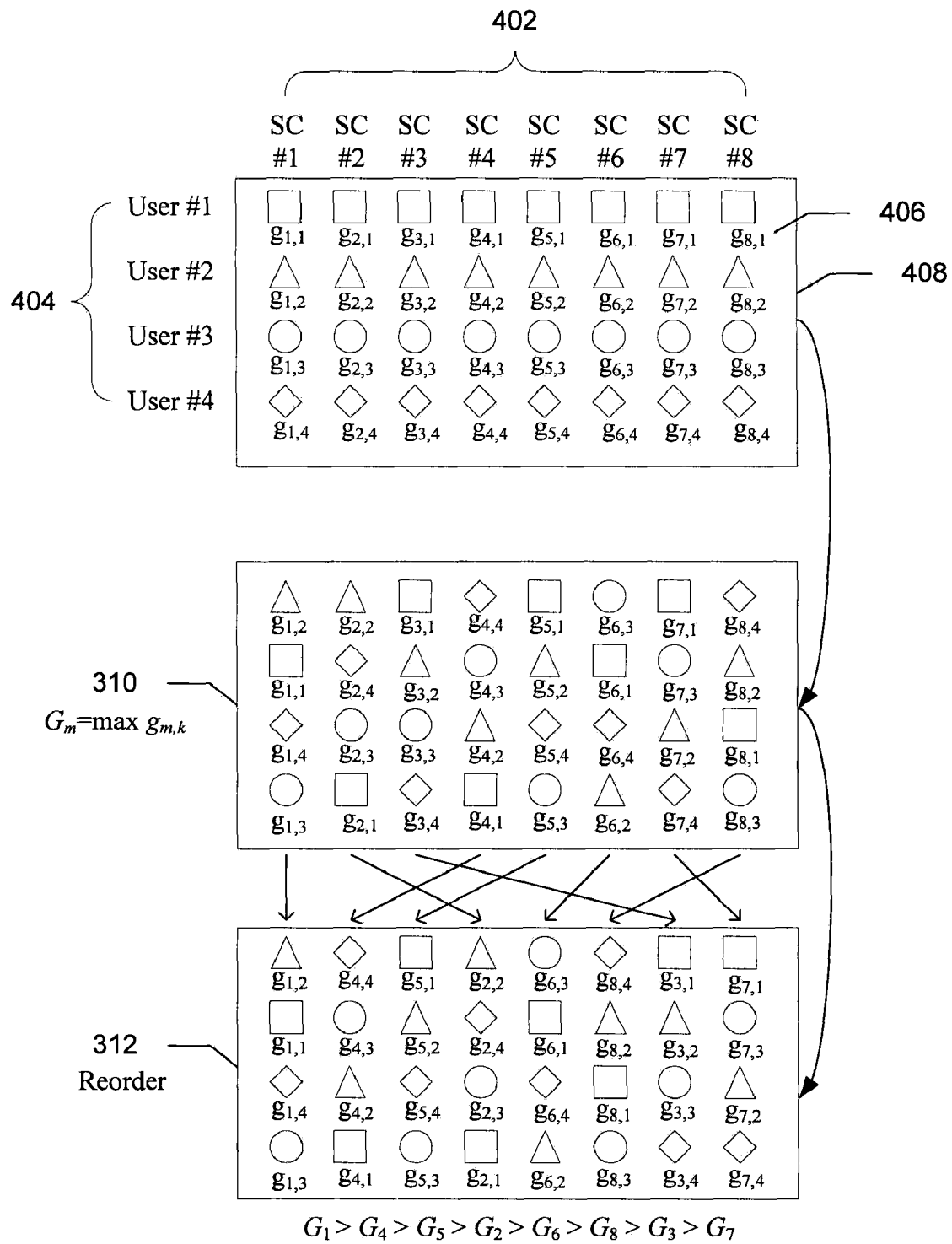
FIG. 4 is a diagram illustrating subcarrier ordering consistent with an embodiment of the present invention.

FIG. 4 is a diagram illustrating subcarrier ordering performed in accordance with the method of Phase-I 302. Referring to FIG. 4, an exemplary 8-subcarrier 402 4-user 404 OFDMA embodiment is assumed. Thus, eight subcarriers 402-1, 402-2, . . . , 402-8 are allocated among four users 404-1, 404-2, . . . , 404-4. An initial subcarrier ordering of channel gains $g_{m,k}$ 406 for an mth subcarrier 402-m of a kth user 404-k (for k=1, 2, 3, 4; similarly represented by the symbols c, Δ, ○, ◇, respectively) is depicted in 408. A ranked ordering of subcarriers based on maximal channel gain $G_m$, which is calculated in block 310 of Phase-I 302 (FIG. 3). A reordered ranking of subcarriers, where $G_m \geq G_1 \geq G_2 \ldots \geq G_M$, is depicted in 312 as determined by performing 312 in Phase-I 302 (see FIG. 3, element 312). An operational order may be determined by comparing the channel gains among all subcarriers, such as $G_1 > G_4 > G_5 > G_2 > G_6 > G_8 > G_3 > G_7$ in this example. Thus, subcarrier-1 402-1 may be the first subcarrier to be assigned, followed by subcarrier-4 402-4, and so on, as depicted in the reordered ranking in 312.

Figure 5:
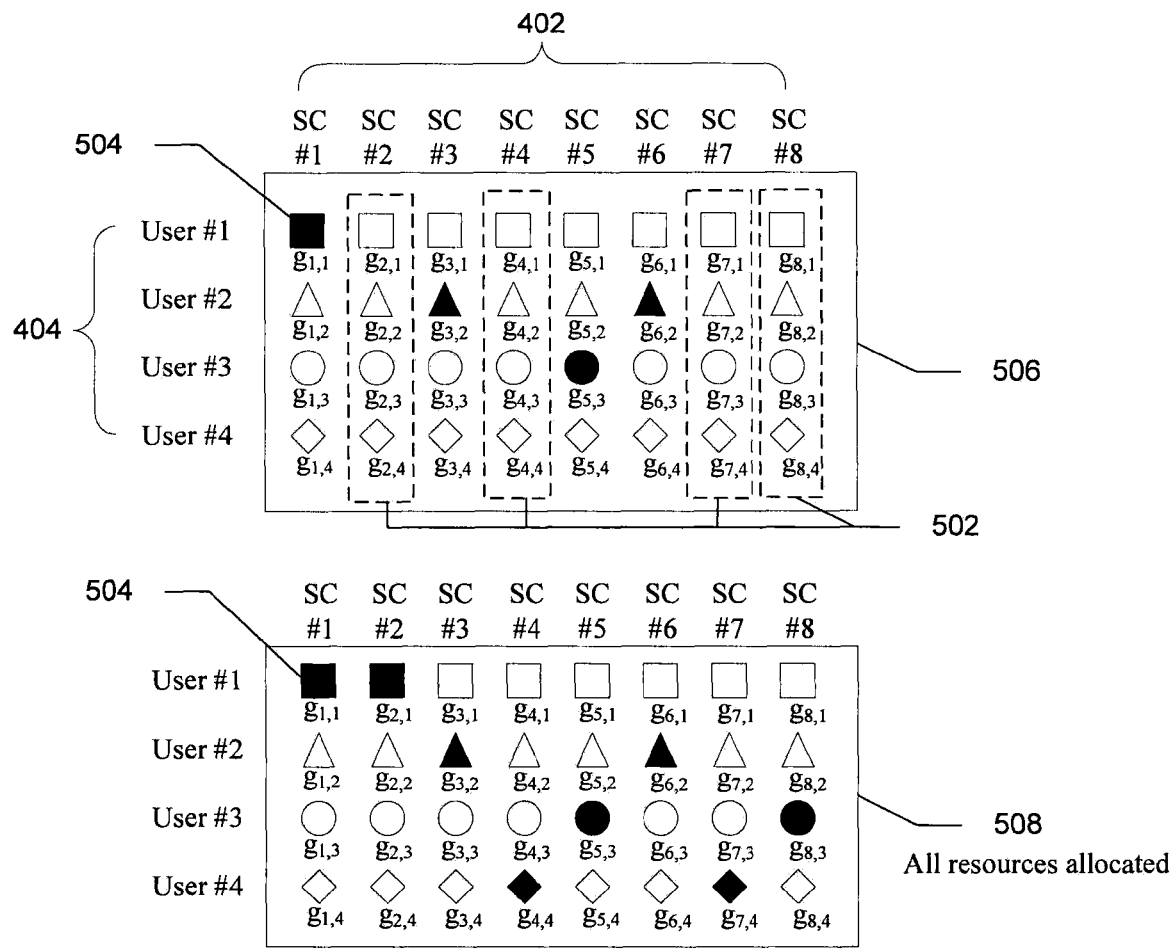
FIG. 5 is a diagram illustrating subcarrier assignment consistent with an embodiment of the present invention.

FIG. 5 is a diagram illustrating subcarrier (RB) assignment in accordance with the methods of Phase-I 302 and Phase-II 304. An exemplary 8-subcarrier 402 4-user 404 OFDMA embodiment is assumed as described in FIG. 4. Referring to FIG. 5, an assignment of a subcarrier 402-m to a user 404-k is depicted by a solid filled symbol (e.g., E). At the completion of Phase-I 302, subcarriers (RBs) have been assigned as depicted in 506, wherein subcarrier 402-1 has been assigned to user 404-1, subcarrier 402-3 has been assigned to user 404-2, subcarrier 402-5 has been assigned to user 404-3, and subcarrier 402-6 has been assigned to user 404-2. Dashed blocks 502 represent remaining unassigned subcarriers subcarrier 402-2, subcarrier 402-4, subcarrier 402-7, and subcarrier 402-8, which may then be assigned to users according to block 320 and block 322 of Phase-II 304 (FIG. 3). As depicted in 508, upon completion of block 322 of Phase-II 304 (FIG. 3), the remaining unassigned subcarriers (RBs) have been assigned, wherein subcarrier 402-2 has been assigned to user 404-1, subcarrier 402-4 has been assigned to user 404-4, subcarrier 402-7 has been assigned to user 404-4, and subcarrier 402-8 has been assigned to user 404-3.

FIGS. 6a, 6b, 7a, and 7b are graphs illustrating performance plots obtained by simulating operation of an OFDMA system. In each of the graphs, signal-to-noise (SNR) is depicted on the x-axis as $E_s/N_o$, where $E_s/N_o$ is the ratio of the symbol energy ($E_s$) to noise power spectral density ($N_o$). A 1024-subcarrier 12-user OFDMA system is assumed. Priorities of users may be fixed in one example but may vary in others. Chase-combining with low-density parity check (LDPC) code using a (480,240) parity check matrix may be used in the HARQ protocol. In addition, a channel model of ITU-R (Indoor office test environment channel A and channel B) may be used as the channel model of the exemplary simulation environment.

Figure 6A:
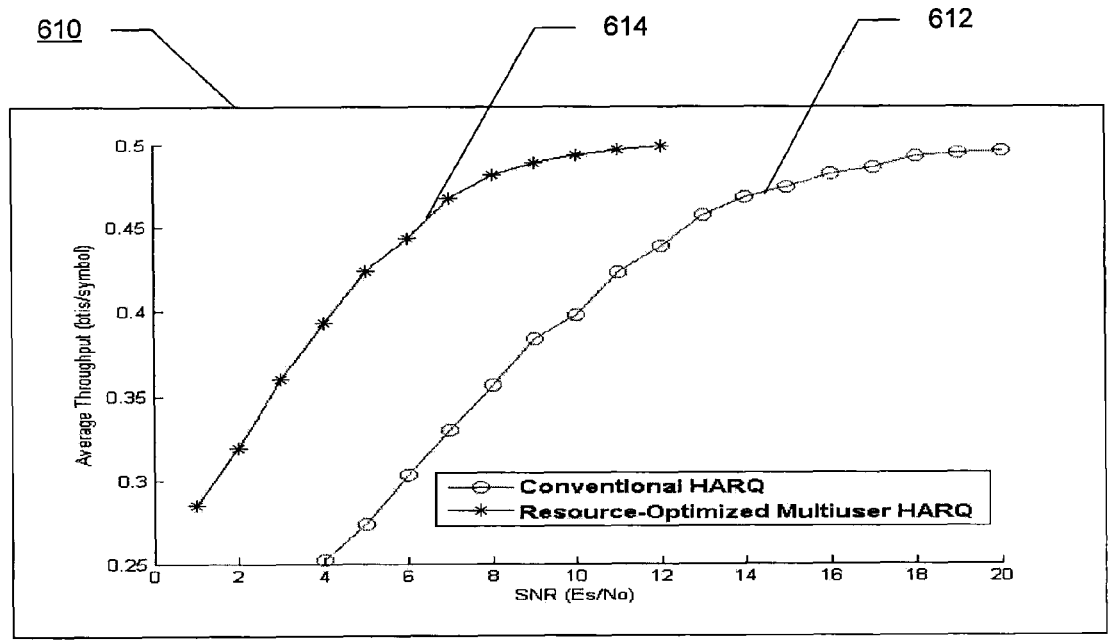
FIGS. 6a and 6b are graphs illustrating performance comparisons of conventional HARQ and generalized link adaptation HARQ in an OFDMA system consistent with an embodiment of the present invention.
Figure 6B:
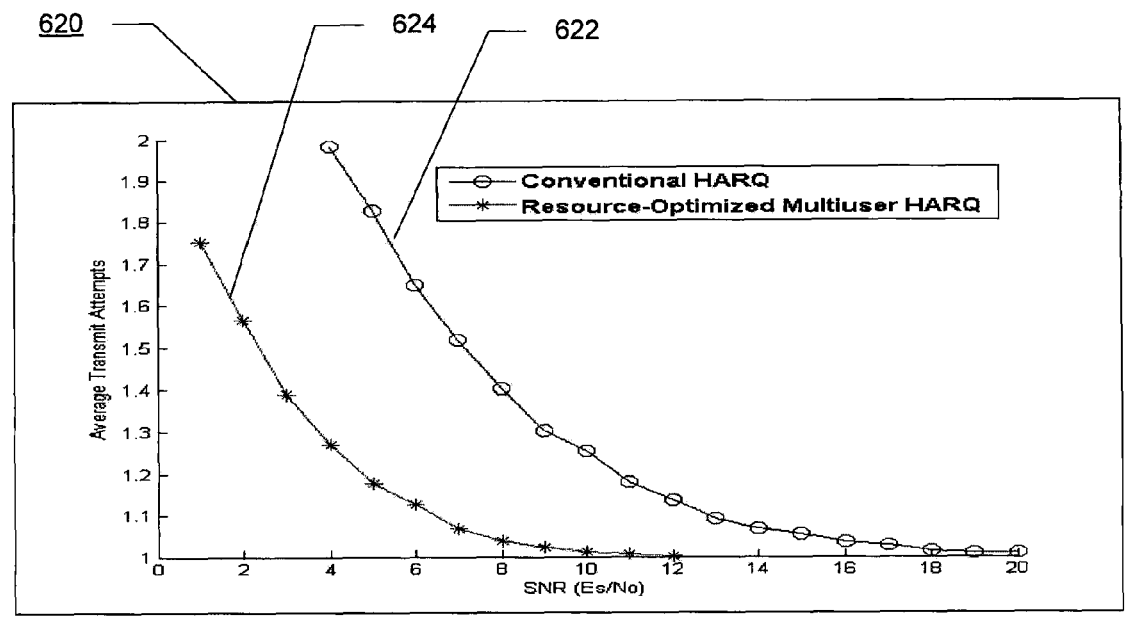

Referring to FIG. 6a, an average throughput graph 610 illustrates an average throughput performance, depicted as bits/symbol on the y-axis, for the exemplary simulated OFDMA system. A plot 612 represents throughput performance using a conventional HARQ protocol. A plot 614 represents throughput performance using a resource-optimized multiuser HARQ protocol consistent with an embodiment of flowchart 300. Referring to FIG. 6b, an average transmit attempts graph 620 illustrates average transmit attempts, depicted on the y-axis, for the exemplary simulated OFDMA system. A plot 622 represents average transmit attempts using a conventional HARQ protocol. A plot 624 represents a corresponding resource-optimized multiuser HARQ protocol consistent with an embodiment of flowchart 300. OFDMA system parameters for the simulation environment with respect to FIGS. 6a and 6b are α=70, β=80, and λ=2.0; with a resource block (RB) set to a group of 18 consecutive subcarriers in six OFDM symbols (18*6). As shown in FIGS. 6a and 6b, an exemplary embodiment of flowchart 300 may provide an approximate 5 dB gain over conventional HARQ in both throughput (FIG. 6a) and delay (FIG. 6b).

Figure 7A:
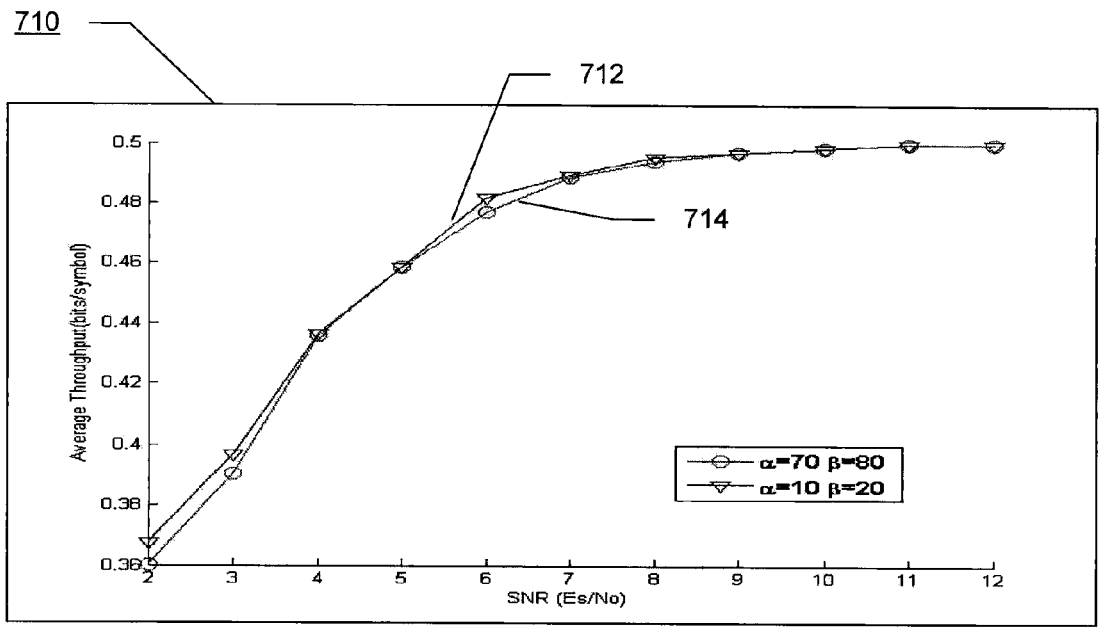
FIGS. 7a and 7b are graphs illustrating throughput performance, based on user priority, in an OFDMA system consistent with an embodiment of the present invention.
Figure 7B:
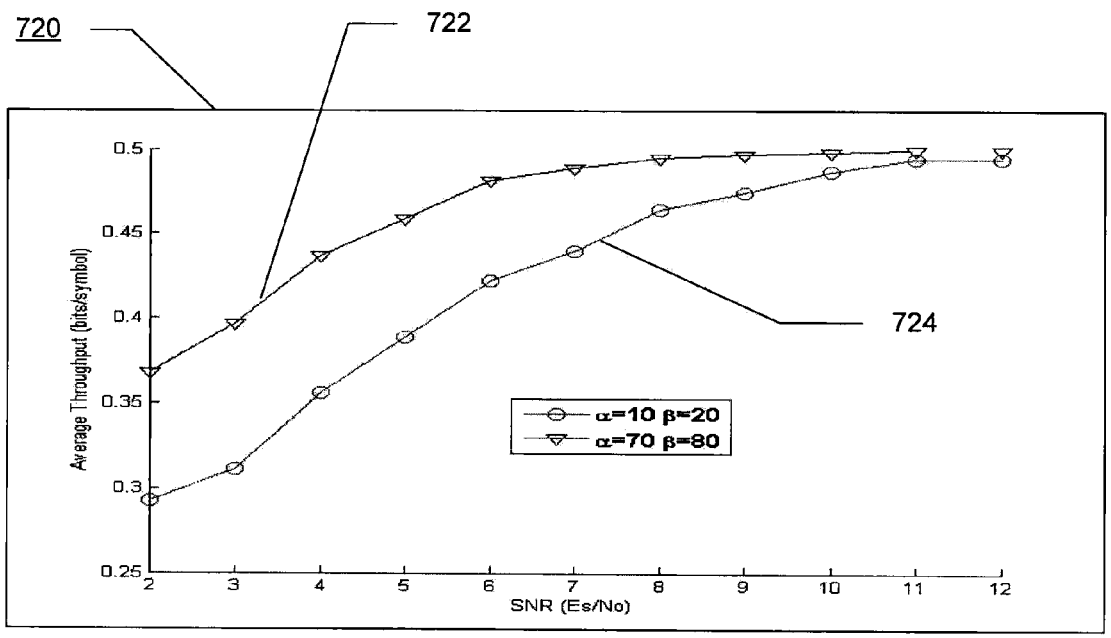

FIGS. 7a and 7b are graphs illustrating average throughput performance, depicted as bits/symbol on the y-axis, of an exemplary embodiment of flowchart 300, by varying different OFDMA system parameters. Referring to FIG. 7a, a graph 710 illustrates average throughput of a user with highest priority. A plot 712 represents average throughput when α=10 and β=20. A plot 714 represents average throughput when α=70 and β=80. Referring to FIG. 7b, a graph 720 illustrates average throughput of a user with lowest priority. A plot 722 represents average throughput when α=70 and β=80. A plot 724 represents average throughput when α=10 and β=20. Other OFDMA system parameters for this exemplary embodiment include a resource block (RB) set to a group of six consecutive subcarriers in six OFDM symbols (6*6). As show in FIGS. 7a and 7b, when increasing the value of α and β, the performance of the user with the lowest priority may be improved significantly (FIG. 7b), while the performance of the user with the highest priority (FIG. 7a) may remain approximately the same.

The above exemplary simulation results suggest that embodiments consistent with flowchart 300 may offer significant performance gain.

Other embodiments will be apparent to those skilled in the art from consideration of the specification and practice disclosed herein. It is intended that the specification and examples be considered as exemplary only, with a true scope and spirit of the invention being indicated by the following claims.

What is claimed is:

1. A method for generalized link adaptation in an orthogonal frequency-division multiple access wireless communications network, the method comprising:
   determining a number of desired resource blocks (RBs) for each user of a plurality of users;
   calculating a maximal channel gain $G_m$ for each RB of a plurality of RBs;
   reordering the plurality of RBs based on the $G_m$;
   assigning one of the plurality of RBs to the plurality of users one-by-one according to the reordering of the plurality of RBs;
   determining a priority list for assigning remaining unassigned RBs;
   assigning the remaining unassigned RBs to the plurality of users based on the priority list; and
   mapping a symbol or a packet to each assigned RB.

2. The method of claim 1, wherein assigning one of the plurality of RBs further comprises applying a predetermined function to determine whether the RB is assigned to the user.

3. The method of claim 2, wherein if the user has been assigned a maximum predetermined percentage of the number of desired RBs, then the RB is not assigned.

4. The method of claim 1, prior to determining a priority list for assigning the remaining unassigned RBs, further comprising determining whether the user has at least a minimum predetermined percentage of the required number of desired RBs.

5. The method of claim 4, wherein if a user does not have at least a minimum predetermined percentage of the number of desired RBs, then assigning RBs with a largest channel gain from a list of unassigned RBs to the user until the minimum predetermined percentage is reached.

6. The method of claim 1, further comprising alternating a mapping of data bits in a packet in a current transmission with a mapping of a previous transmission.

7. The method of claim 1, wherein mapping a symbol or a packet to each assigned RB further comprises permuting a bits-to-subcarrier mapping if a retransmission is required.

8. The method of claim 1, wherein determining a priority list further comprises giving a higher priority to a user based on a predetermined number of past unsuccessful transmission attempts by the user.

9. The method of claim 1, wherein determining a priority list further comprises giving a higher priority to a user based on a predetermined QoS requirement.

10. The method of claim 9, wherein the predetermined QoS requirement is based on delay.

11. The method of claim 1, wherein assigning the remaining unassigned RBs to the plurality of users further comprises assigning to one of the users an unassigned RB, wherein the unassigned RB has a largest channel gain of the remaining unassigned RBs.

12. The method of claim 1, wherein the hybrid automatic retransmission request is an incremental redundancy based hybrid automatic retransmission request.

13. The method of claim 1, wherein a RB is a subcarrier.

14. A system for generalized link adaptation in an orthogonal frequency-division multiple access wireless communications network, the system comprising:
   a transmitter unit configured to
      determine a number of desired RBs for each user of a plurality of users,
      calculate a maximal channel gain $G_m$ for each RB of a plurality of RBs,
      reorder the plurality of RBs based on the $G_m$,
      assign one of the plurality of RBs to the plurality of users according to the reordering of the plurality of RBs,
      determine a priority list for assigning remaining unassigned RBs,
      assign the remaining unassigned RBs to the plurality of users one-by-one based on the priority list,
      map a symbol or a packet to each assigned RB, and
      transmit the assigned RBs to a mobile station.

15. The system of claim 14, further comprising a receiver configured to receive transmissions from a mobile station.

16. The system of claim 14, wherein a RB is a subcarrier.

* * * * *